United States Patent [19]

Main

[11] 4,354,711

[45] Oct. 19, 1982

[54] VEHICLE WHEEL ASSEMBLY

[75] Inventor: John A. Main, Plymouth, Mich.

[73] Assignee: Kelsey-Hayes Co., Romulus, Mich.

[21] Appl. No.: 142,486

[22] Filed: Apr. 21, 1980

[51] Int. Cl.³ ............................................. B60B 27/00
[52] U.S. Cl. .................... 301/9 CN; 301/114;
     301/6 R; 180/75; 308/189 A; 29/526 R;
     403/166
[58] Field of Search .................. 301/9 R, 9 CN, 9 S,
     301/9 SC, 11 R, 111, 112, 114–117, 6 R, 6 E;
     403/1, 166, 258–260; 308/189 A; 29/526 R,
     446; 180/75, 88

[56] References Cited

U.S. PATENT DOCUMENTS

| | | | |
|---|---|---|---|
| 1,605,360 | 11/1926 | Ludwick | 301/9 CN |
| 1,627,202 | 5/1927 | Ragsdale | 301/9 CN |
| 3,102,758 | 9/1963 | Holmes | 301/9 CN |

FOREIGN PATENT DOCUMENTS

| | | | |
|---|---|---|---|
| 617256 | 8/1935 | Fed. Rep. of Germany | 301/9 CN |
| 1806566 | 11/1977 | Fed. Rep. of Germany | 301/114 |
| 635039 | 3/1928 | France | 301/9 CN |
| 728895 | 7/1932 | France | 301/9 CN |

Primary Examiner—H. Grant Skaggs
Attorney, Agent, or Firm—Ralph J. Skinkiss; Ronald W. Wangerow; William P. Hickey

[57] ABSTRACT

A vehicle wheel assembly comprises a detachable wheel mounted on a radial wheel mounting flange using a single wheel fastener and a conical disc spring to secure the wheel to the wheel mounting flange.

The conical disc spring is deflected to a preselected compressed state by the fastener to exert a predetermined axial clamping force uniformly along an annular region of contact between the wheel and the disc spring and to resiliently pre-load the wheel bearings. A lock prevents the single fastener from working loose.

9 Claims, 8 Drawing Figures

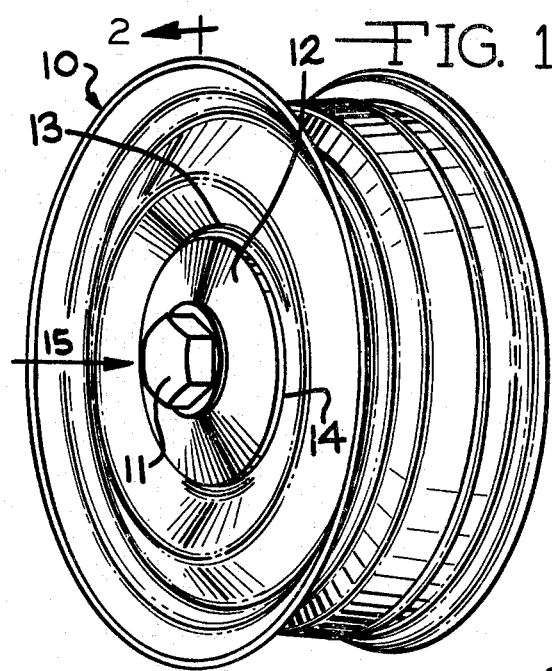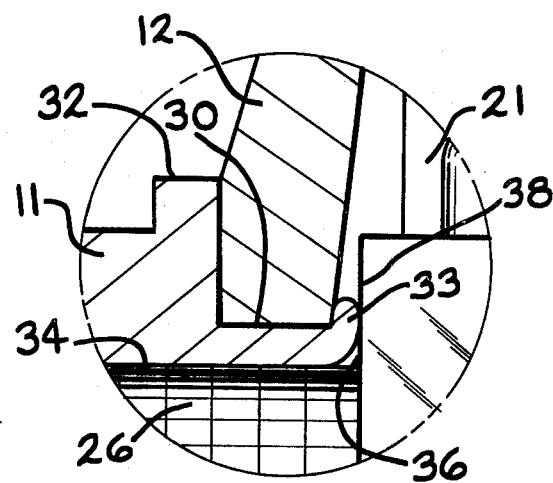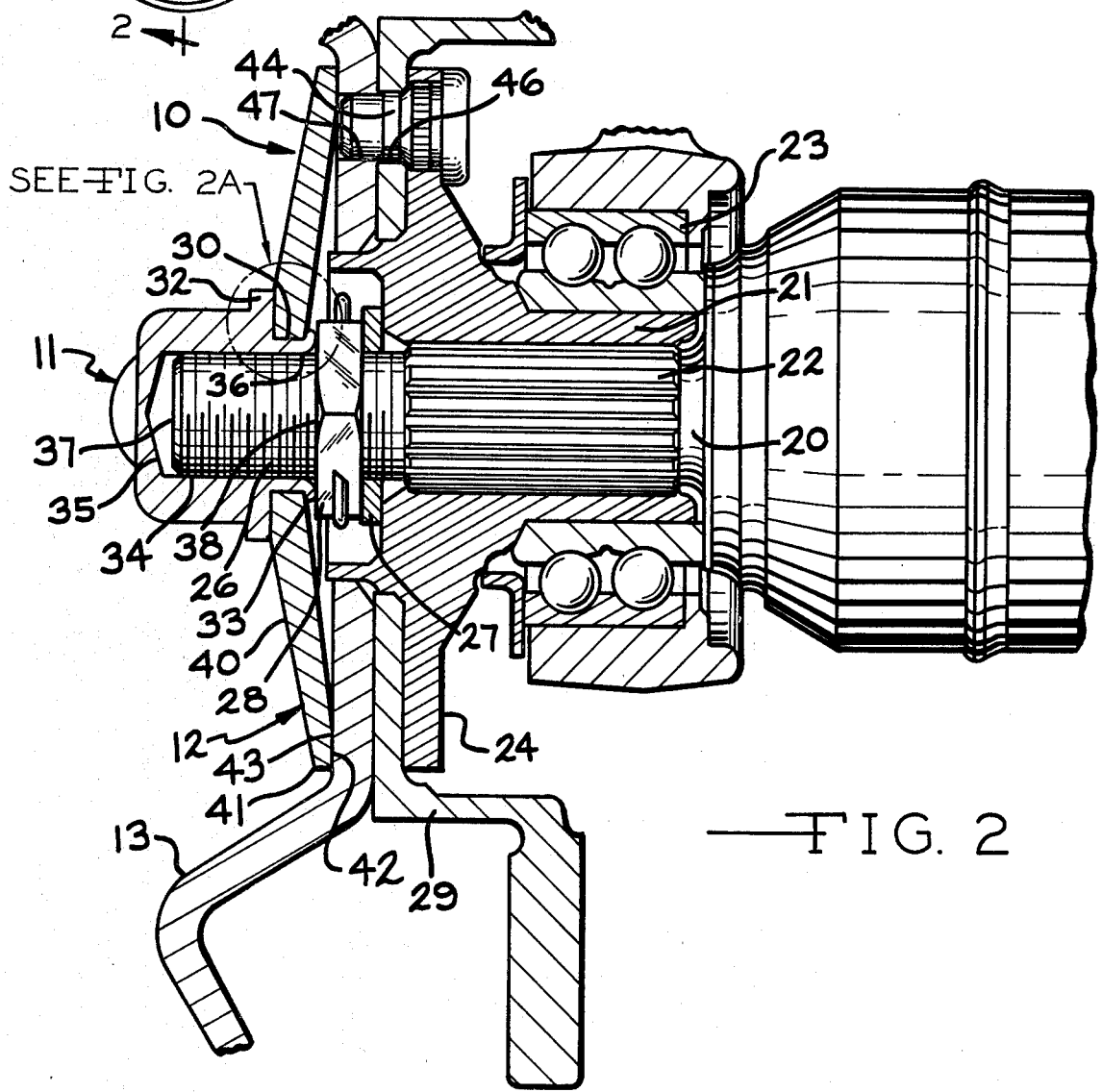

VEHICLE WHEEL ASSEMBLY

BACKGROUND OF THE INVENTION

1. Field of the Invention

The invention relates to apparatus for mounting a wheel on a vehicle and more particularly to mounting apparatus providing a predetermined, uniform clamping force around an annular zone of contact between the mounting apparatus and the vehicle wheel thereby securing the wheel to the wheel mounting flange upon which it is mounted.

2. Description of the Prior Art

A conventional vehicle wheel is mounted by means of a plurality of lug nuts threaded onto stud bolts extending outwardly from a wheel mounting flange, such as a flanged hub or an axle flange, through bolt holes in the spider of the wheel. The wheel mounting flange in a conventional wheel assembly includes an outwardly-extending end that receives and engages a central pilot hole in the wheel spider. The lug nuts generally have coneshaped seats that engage correspondingly-sloped bosses surrounding the bolt holes in the wheel spider.

In a conventional wheel assembly, the required axial clamping force to secure the wheel to the wheel mounting flange is obtained by tightening the lug nuts to a specified torque level. Thus, the clamping force is directly dependent upon the friction between the lug nut threads and the stud bolt threads and, more significantly, between the lug nut seats and the wheel spider bosses around each bolt hole. The coefficient of friction between these mating surfaces changes dramatically from the first time the wheel is mounted. Such changes primarily result from wear and material deformation each time the lug nuts are removed and re-installed during tire changing, tire rotation and vehicle inspections.

Because of the above-described changes in friction, the torque needed to adequately tighten the lug nuts varies drastically. Thus if the friction on a particular lug nut increases, that nut may be tightened to the specified torque level but the clamping force provided by it may be too low. Conversely, if the friction on another lug nut on the same wheel decreases, that nut may also be tightened to the proper torque level but provide a clamping force significantly higher than that provided by the other nuts on the same wheel. Therefore, lug nut torque has proven to be a rather poor indicator of the axial clamping force securing the wheel to the wheel mounting flange. As a result, wide variances in clamping force from lug nut to lug nut may be present on the same wheel. Such non-uniform and unknown clamping forces frequently cause warping, twisting and distortion of the wheel spider, the brake rotor or drum, and other vehicle components, all of which seriously decrease the performance and life of the affected component. Thus a wheel mounting means is needed that is capable of providing a repeatable, predetermined and uniform axial clamping force on a vehicle wheel.

Single fastener wheel assemblies using washer-type discs are known in the prior art of which U.S. Pat. Nos. 1,681,503; 1,691,488; 1,813,431; and 1,816,643 are exemplary. The devices disclosed in the prior art, however, neither accomplish the objects of the present invention nor incorporate its novel features.

SUMMARY OF THE INVENTION

In accordance with the present invention, a new and improved vehicle wheel assembly comprises a wheel detachably mounted upon a wheel mounting flange which is mounted for rotation with a spindle. A single fastener, engaged with a conical disc spring, removably engages the wheel mounting flange or the spindle to secure the wheel to the hub mounting flange.

Each time the wheel is secured to the wheel mounting flange, the fastener axially compresses the disc spring by a predetermined amount. The disc spring has a spring characteristic such that when deflected into a preselected compressed state, it exerts a repeatable predetermined axial clamping force uniformly along an annular region of contact with the wheel, thereby securing the wheel to the wheel mounting flange. The disc spring also resiliently imparts a desirable pre-loading to the wheel bearings.

The wheel and wheel mounting flange are circumferentially interlocked preferably by a drive stud or post extending outwardly from the wheel mounting flange through an aperture in the brake rotor (or extending from the brake drum if the vehicle has drum brakes) to engage an aperture or socket in the spider of the wheel. The drive stud and aperture apparatus provides a positive drive to ensure that the wheel and wheel mounting flange rotate together but provides no axial clamping force between the wheel and the wheel mounting flange.

The assembly also may include a locking mechanism that prevents the fastener from working loose from the spindle or the wheel mounting flange.

BRIEF DESCRIPTION OF THE DRAWINGS

FIG. 1 is a perspective view of an automobile wheel assembly embodying the invention.

FIG. 2 is a cross-sectional view of the vehicle wheel assembly taken along line 2—2 of FIG. 1, showing the preferred embodiment of the invention.

FIG. 2A is an enlarged view of the circled portion of FIG. 2 showing the details of the fastener construction of the preferred embodiment.

DETAILED DESCRIPTION OF THE PREFERRED EMBODIMENTS

Figure 4:
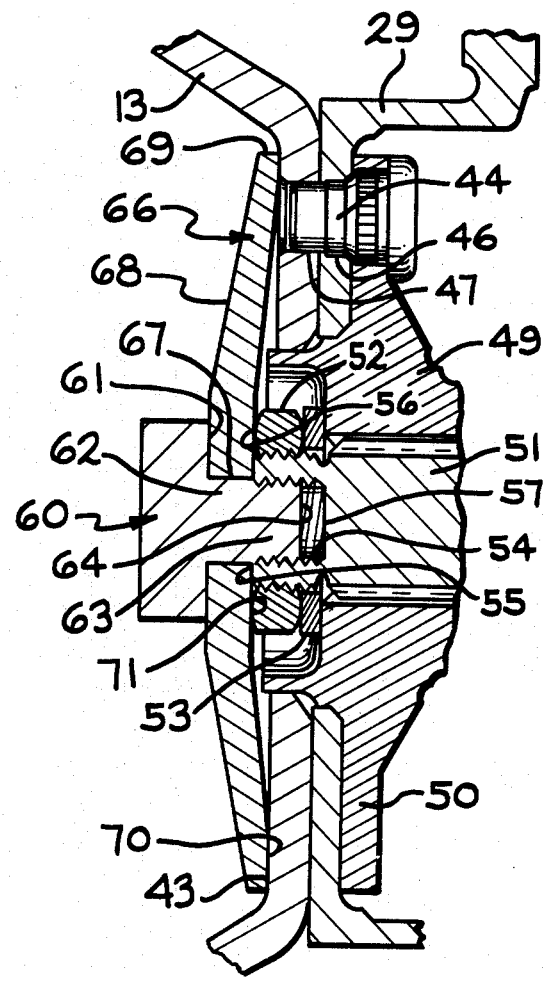
FIG. 4 is a cross-sectional view, showing a first alternate embodiment of the invention.

Referring to the drawings, where like elements are indicated by like numerals, FIG. 1 illustrates a vehicle wheel 10 having a fastener 11 protruding through the center of disc spring 12 to engage the spindle, or the wheel mounting flange (not shown) of the vehicle. The term "wheel mounting flange" includes either a flanged hub, an axle flange, or other wheel mounting structures known to those skilled in the art. For purposes of illustration, the drawings show vehicle wheel assemblies having flanged hubs. It is to be understood, however, that an axle flange or other wheel mounting flanges known to those skilled in the art may be substituted for a flanged hub in any of the embodiments of the invention. Disc spring 12 abuts wheel spider 13 of wheel 10 along an annular peripheral region 14 of disc spring 12, exerting a predetermined, continuous and uniform clamping force in the axial direction as indicated by arrow 15, thereby urging wheel 10 against the wheel mounting flange.

Preferred Embodiment

In FIG. 2, the preferred embodiment of the invention is shown in a cross-sectional view. Spindle or support 20 is rotationally interlocked with hub 21 by means of splined portion 22. Hub 21 is rotationally carried by bearing assembly 23 and includes hub flange 24. Spindle 20 has a threaded portion 26 that protrudes through washer 27 to engage spindle nut 28, thereby securing hub 21 to spindle 20. Spindle nut 28 is locked in place by cotter pin 25. Brake rotor 29 and wheel 10 are mounted on hub flange 24 for rotation with hub 21.

Fastener 11 protrudes through disc aperture 30, capturing disc spring 12 in the axial direction between fastener flange 32 and fastener lip 33. As is shown in FIG. 2A, which is an enlarged view of the circled portion of FIG. 2, fastener lip 33 is flared outwardly so that disc spring 12 is axially captured between fastener flange 32 and fastener lip 33 but is free to rotate circumferentially about fastener 11 until annular peripheral surface 42 (see FIG. 2) comes into contact with wheel spider 13 when fastener 11 is screwed onto externally threaded portion 26 of spindle 20. Fastener lip 33 may be formed after fastener 11 is inserted into disc aperture 30 by any known processes, such as spinning or swaging, so that the diameter of fastener lip 33 is larger than that of disc aperture 30.

Although fastener lip 33 is shown in FIGS. 2 and 2A, and functionally equivalent lip structures will be shown in other alternative embodiments, such a lip may be eliminated in any of the embodiments of the invention. However, if lip 33 is eliminated, fastener 11 and the other fasteners in other embodiments would be free to be removed from disc spring 12 after being unscrewed from spindle 20.

Fastener 11 in FIG. 2 has an internally threaded cavity 34 that extends axially from cavity end 35 to the inboard end 36 of fastener 11, having an axial depth that is greater than the axial distance from spindle end 37 to outboard surface 38 of spindle nut 28. Thus when screwed onto externally threaded portion 26 of spindle 20, fastener 11 abuts outboard surface 38 of spindle nut 28 prior to spindle end 37 coming into contact with cavity end 35 so as to limit the inboard axial travel of fastener 11 along externally threaded portion 26 each time it is screwed onto spindle 20.

Disc spring 12 has a conical body 40 that is tapered such that its thickness is greater adjacent its aperture 30 than at its peripheral edge 41. The annular peripheral surface 42 of disc spring 12 is machined at an appropriate angle to flatly engage wheel spider surface 43. Disc spring 12 has a known spring characteristic so that when an axial load is applied by fastener 11, disc spring 12 will exert a predetermined clamping force axially against wheel spider 13 for a preselected degree of disc compression. Therefore, each time fastener 11 is screwed onto spindle 20 until it abuts against outboard surface 38 of spindle nut 28, disc spring 12 is axially compressed the same amount into a preselected compressed state and exerts the same predetermined clamping force urging wheel spider 13 against brake rotor 29 and hub flange 24. Furthermore, since conical body 40 is symmetrical about aperture 30, the axial clamping force is circumferentially uniform along annular peripheral surface 42.

Fastener 11 and disc spring 12 cause spindle 20 to be axially loaded in tension (as indicated by arrow 17) and cause hub 21 to be axially loaded in compression (as indicated by arrow 18), thereby axially pre-loading wheel bearing assembly 23. Although disc spring 12 is relatively stiff, it is significantly more resilient than the wheel, the wheel bearings or other related wheel assembly components. Therefore, disc spring 12 tends to cushion and dampen high axial shock loads such as those encountered during cornering. It is thus expected that the cushionibng effect of disc spring 12 will reduce the wear on wheel bearing assembly 23 and prolong the fatigue life of the wheel, the bearings, the hub and related wheel assembly components.

Vehicle wheel 10 is circumferentially interlocked with hub 21 and brake rotor 29 by means of post 44 which is rigidly attached to hub flange 24 and extends through rotor aperture 46 and into, but not completely through, wheel spider aperture 47. Although only one interlock assembly is illustrated, a plurality of such posts and apertures may be employed to meet the torque requirements of a particular vehicle. Post 44 prevents rotation of vehicle wheel 10 relative to brake rotor 29 and hub 21 but provides no axial clamping force.

The preferred embodiment of the invention illustrated in FIG. 2 may also be used on non-driven vehicle wheels by substituting a freewheeling live spindle for spindle 20.

Figure 3:
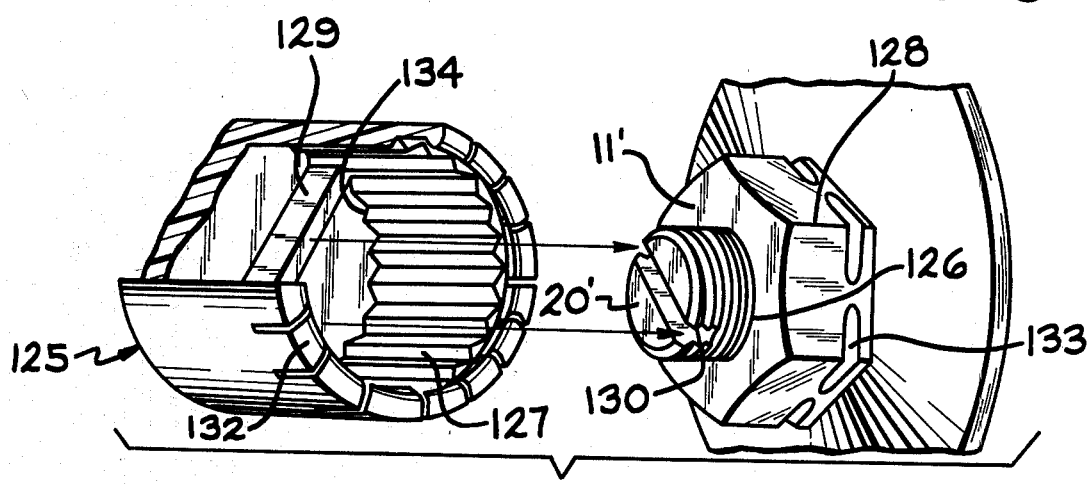
FIG. 3 is a detailed view of a preferred locking means for the preferred embodiment of the invention.

FIG. 3 illustrates a preferred locking means that may be used in the preferred embodiment with only slight modifications to fastener 11 and spindle 20. Locking cap 125 (shown partially cut away) engages modified fastener 11' which has an outboard aperture 126, through which modified spindle 20' extends such that splines 127 engage hex points 128 of fastener 11'. Retaining bar 129 engages slot 130 in modified spindle 20' so as to prevent fastener 11' from turning and working loose. Clip members 132 on locking cap 125 resiliently engage circumferential slots 133 to secure locking cap 125 to fastener 11'. Since retaining bar 129 is rigidly attached to locking cap 125, and splines 127 are cut in the internal wall 134 of locking cap 125, fastener 11' is prevented from rotating with respect to spindle 20' until locking cap 125 is removed.

First Alternate Embodiment

FIG. 4 illustrates an alternate embodiment of the invention which is similar to the preferred embodiment but includes the following distinguishing features. Hub 49 and hub flange 50 are mounted for rotation with spindle 51 by means of spindle nut 52 and washer 53. Spindle 51 has an internally threaded cavity 54 with a cavity bottom 57 and an outboard end 55. Outboard end 55 of spindle 51 is essentially coplanar with outboard surface 56 of spindle nut 52 when spindle nut 52 is fully screwed onto spindle 51.

Fastener 60 has a shoulder 61, a shank 62, an externally threaded stud 63, and an inboard stud end 64. Disc spring 66 has an aperture 67, a conical body 68, and a peripheral edge 69. Conical body 68 is circumferentially symmetrical about aperture 67 and is tapered such that its thickness is greater adjacent aperture 67 than at peripheral edge 69. The annular peripheral surface 70 is machined at an appropriate angle to flatly abut wheel spider surface 43, and the inboard mating surface 71 is machined to flatly abut the outboard end 55 of spindle 51 and the outboard surface 56 of spindle nut 52.

Fastener 60 protrudes through disc spring 66 such that shank 62 internally engages aperture 67, and its externally threaded stud 63 engages the internally threaded cavity 54 of spindle 51. The axial length of externally threaded stud 63 is less than the depth of internally threaded cavity 54. Thus when fastener 60 is screwed into spindle 51, the inboard mating surface 71 of disc spring 66 flatly abuts outboard end 55 of spindle 51 and outboard surface 56 of spindle nut 52 prior to the inboard stud end 64 of fastener 60 coming into contact with cavity bottom 57, thereby limiting fastener 60 to a predetermined amount of inboard axial travel along internally threaded cavity 54. Therefore, each time fastener 60 is screwed into spindle 51, disc spring 66 is axially compressed the same predetermined amount into a preselected compressed state and is pre-set to exert the same predetermined clamping force urging wheel spider 13 against brake rotor 29 and hub flange 24 as described above with respect to the preferred embodiment.

Fastener 60 and disc spring 66 also pre-load the wheel bearings and cushion axial shock loads as is fully described for the preferred embodiment.

The vehicle wheel is circumferentially interlocked with hub 49 and brake rotor 29 by means of post 44 protruding through rotor aperture 46 into, but not through, wheel spider aperture 47 as is fully described above with respect to the preferred embodiment.

The first alternate embodiment of the invention illustrated in FIG. 4 may also be used on a non-driven vehicle wheel by substituting a free-wheeling live spindle for spindle 51.

A conventional locking means known to persons skilled in the art, such as an elastomeric insert (not shown) between the threads, may be used to prevent the fastener and the spindle nut from turning and working loose on the spindle.

Second and Third Alternate Embodiments

Figure 5:
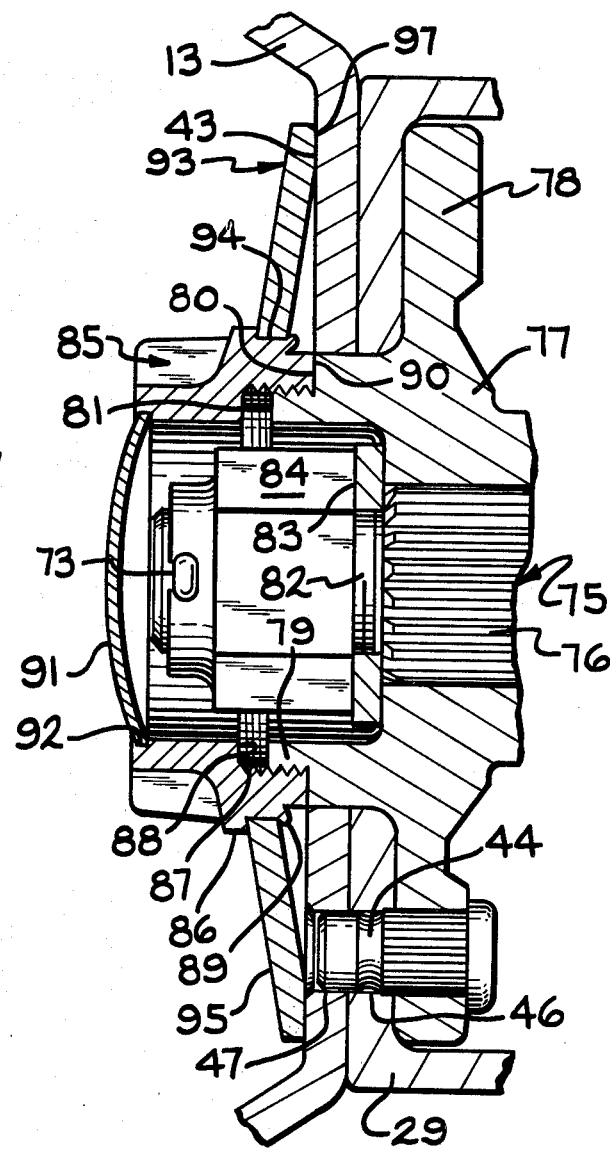
FIG. 5 is a cross-sectional view, showing a second alternate embodiment of the invention.

FIG. 5 illustrates an additional alternate embodiment of the present invention. Spindle 75 is rotationally interconnected by splined portion 76 to hub 77. Hub 77 includes a hub flange 78, a cup-shaped externally threaded portion 79, having an outer annular surface 80, and an inner annular surface 81. Hub 77 is axially mounted on spindle 75 by means of spindle threaded portion 82 protruding through washer 83 to engage spindle nut 84. Brake rotor 29 and wheel spider 13 are mounted on hub flange 78 for rotation with hub 77. Cotter pin 73 locks spindle nut 84 in place.

Fastener 85 has a flared shoulder 86, an internally threaded cavity 87, an annular cavity bottom surface 88, a flared lip 89 and an annular abutment surface 90. Fastener 85 may also include decorative cap 91 mounted in annular recess 92.

Disc spring 93 includes an aperture 94 at its center, conical body 95, and an annular peripheral surface 97. Conical body 95 is illustrated in FIG. 5 as being of uniform thickness. However, as with any of the preferred or alternate embodiments of the present invention, disc spring 93 may be provided with a conical body having a non-uniform thickness but which is symmetrical about aperture 94. The annular peripheral surface 97 of disc spring 93 is machined at an appropriate angle to flatly engage wheel spider surface 43.

Fastener 85 protrudes through aperture 94, capturing disc spring 93 in the axial direction between flared shoulder 86 and flared lip 89 such that disc spring 93 is free to rotate circumferentially about fastener 85 when not in contact with wheel spider 13. The axial depth of internally threaded cavity 87 is greater than the axial length of the externally threaded portion 79 of hub 77. Thus when fastener 85 is screwed onto hub 77, the fastener annular abutment surface 90 abuts the hub outer annular surface 80 prior to the hub inner annular surface 81 coming into contact with annular cavity bottom 88, thereby limiting fastener 85 to a predetermined amount of inboard axial travel along the externally threaded portion 79 of hub 77. Thus, each time fastener 85 is screwed onto hub 77, disc spring 93 is axially compressed the same predetermined amount into a preselected compressed state and, as is described above with respect to the preferred embodiment, exerts the same predetermined axial clamping force urging the wheel spider 13 against brake rotor 29 and hub flange 78.

The vehicle wheel is circumferentially interlocked with hub 77 and brake rotor 29 by means of post 44 protruding through rotor aperture 46 into wheel spider aperture 47 as is fully described above with respect to the preferred embodiment.

Figure 6:
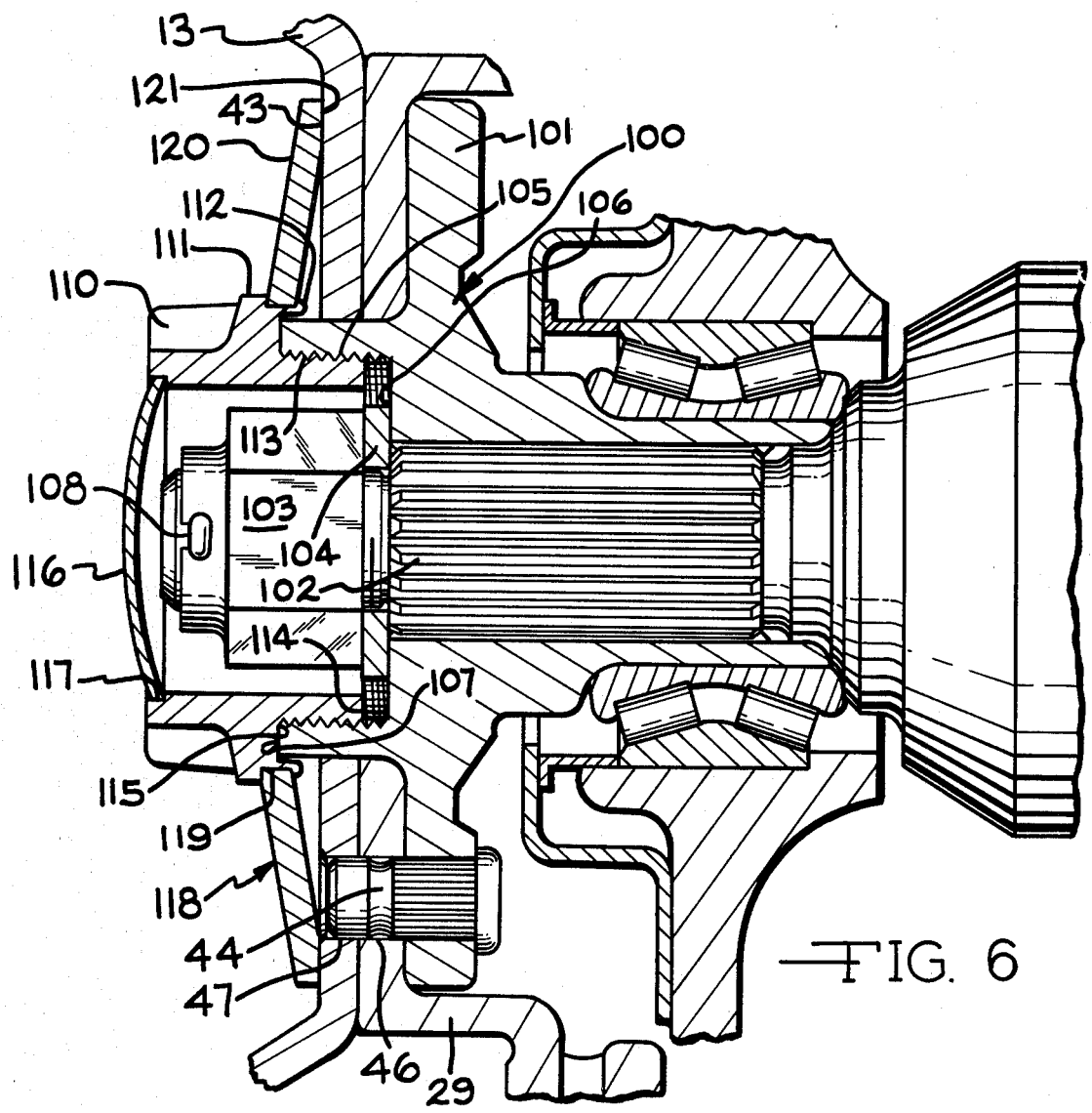
FIG. 6 is a cross-sectional view, showing a third alternate embodiment of the invention.

FIG. 6 illustrates another alternate embodiment of the invention which, although similar to the second alternate embodiment, has the following distinguishing features. Hub 100 and hub flange 101 are mounted for rotation with spindle 102 by means of spindle nut 103 and washer 104. Hub 100 includes a cup-shaped internally threaded cavity 105, a cavity bottom 106, and an outer annular surface 107. Spindle nut 103 is locked in place by cotter pin 108.

Fastener 110 has a flared shoulder 111, a flared lip 112, an externally threaded portion 113, an outer annular surface 114, and an abutment surface 115. Fastener 110 also may include decorative cap 116 mounted in annular recess 117.

Disc spring 118 includes an aperture 119 at its center, conical body 120, and annular peripheral surface 121 which is machined at an appropriate angle to flatly engage wheel spider surface 43.

Fastener 110 protrudes through aperture 119, capturing disc spring 118 in the axial direction between flared shoulder 111 and flared lip 112 such that disc spring 118 is free to rotate circumferentially about fastener 110 when not in contact with wheel spider 13. The axial length of externally threaded portion 113 is smaller than the axial depth of internally threaded cavity 105 of hub 100. Thus when fastener 110 is screwed into hub 100, the fastener abutment surface 115 abuts the hub outer annular surface 107 prior to the fastener outboard annular surface 114 coming into contact with cavity bottom 106, thereby limiting fastener 110 to a predetermined amount of inboard axial travel within internally threaded cavity 105 of hub 100. Thus, each time fastener 110 is screwed into hub 100, disc spring 118 is axially compressed the same predetermined amount into a preselected compressed state and, as is described above, exerts the same predetermined axial clamping force urging the wheel spider 13 against brake rotor 29 and hub flange 101.

The vehicle wheel is circumferentially interlocked by the same means as is described above with respect to the preferred embodiment.

The second and third alternate embodiments of the invention illustrated in FIGS. 4 and 5 may also be used on non-driven vehicle wheels having either free-wheeling live spindles or wheel hubs that are rotatably mounted on non-rotating spindles. In the embodiments shown in FIGS. 5 and 6, fasteners 85 and 110 attached directly to wheel hubs 77 and 100 and thus do not pre-load the wheel bearings as do the embodiments shown in FIGS. 2 and 4.

A conventional locking means known to persons skilled in the art, such as an elastomeric insert (not shown) between the fastener threads and the threaded portion of the hub, may be used in either of the second and third alternate embodiments to prevent the fastener from turning and working loose on the hub.

Performance Characteristics

Figure 7:
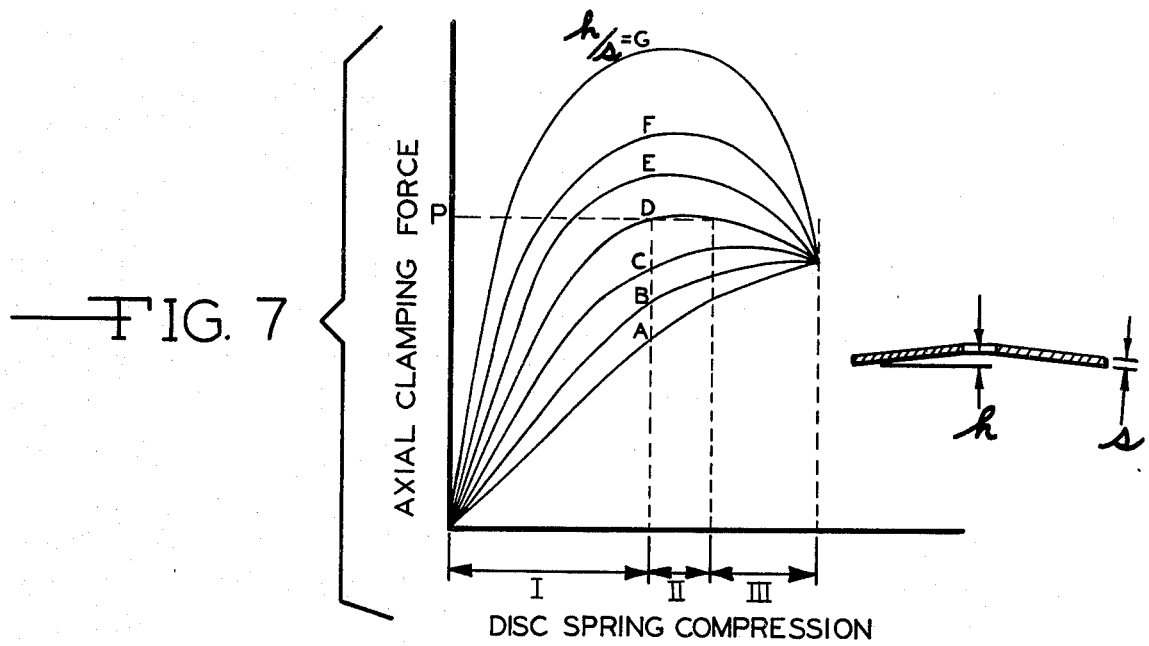
FIG. 7 is a plot showing a family of typical spring characteristic curves for disc springs of varying parameters.

Persons skilled in the art know that the spring characteristics of disc springs depend upon such factors as the modulus of elasticity of the spring material, the ratio of the outside diameter of the disc to the inside diameter of the central aperture (diameter ratio), the apex angle of the disc, and the h/s ratio, wherein h is the initial cone height of the uncompressed conical body and s is its thickness, as illustrated in FIG. 7. A family of typical spring characteristics curves are shown in FIG. 7 for disc springs having a conical body of uniform thickness as applied to the present invention. The curves generally illustrate, in non-dimensional terms, the relationship between axial disc compression and axial clamping force for disc springs of the present invention having various h/s ratios and a given modulus of elasticity, diameter ratio and apex angle. The curves are derived from the curves for generic disc springs illustrated in *Handbook of Precision Engineering*, Vol. 6, pg. 140, edited by A. Davidson (McGraw-Hill 1972).

FIG. 7 has non-dimensionalized axial clamping force, $F/F_h$, plotted on its ordinate and non-dimensionalized disc spring compression, $f/h$, plotted on its abscissa. The symbol F represents the total axial clamping force around the periphery of the disc spring; $F_h$ represents the load applied to the disc spring by the fastener necessary to completely collapse the disc spring; f represents the distance that the disc spring is compressed by the fastener; and h represents the initial cone height of the uncompressed disc spring. Therefore, when the disc spring is completely collapsed, $F/F_h=1$ and $f/h=1$. Curves A through G are spring characteristic curves for progressively increasing h/s ratios with curve A having the lowest h/s ratio and curve G having the highest h/s ratio of those shown.

Except for disc springs having very low h/s ratios, the non-dimensionalized spring characteristic curves for disc springs are generally parabolic and have three readily identifiable zones. In zone I of the curve in FIG. 7, the clamping force increases relatively rapidly as the disc is compressed. In zone II the curves flatten out since the clamping force changes very little, relative to the remainder of the curve, even though the disc is being further compressed. Finally, in zone III the clamping force actually decreases as disc compression increases until the disc is completely flattened out, at which point all the curves intersect. Thus, in order to maintain a relatively constant and stable axial clamping force on a vehicle wheel, the disc spring of the present invention desirably exerts the required axial clamping when compressed to a pre-selected state within zone II of the spring characteristic curve.

If the desired non-dimensionalized axial clamping force for a vehicle is P in FIG. 7, the disc spring is engineered to have a spring characteristic curve such as curve D. Thus when the fastener is tightened down to the limit of its axial travel on the spindle or hub, it compresses the disc spring by a predetermined amount that falls within the condition represented by zone II of the curve. Any variance in the amount of disc compression caused by side loads on the vehicle wheel, such as those encountered during cornering, will not cause an unacceptable variance in axial clamping force so long as the disc compression remains within the condition represented by zone II in FIG. 7.

The shape of the spring characteristic curves in FIG. 7 may be altered in any of the embodiments of the invention by using a disc spring having a non-uniform thickness. For example, the disc spring may be tapered, such that it is thicker adjacent its central aperture than at its periphery, as is illustrated in FIG. 2, or such that it is thicker at its periphery than at its central aperture. For some applications, disc springs having alternately increasing and decreasing thicknesses across the conical body, or those having an apex angle that varies as the disc diverges, may be desirable. The cross-sectional shape of the disc spring is dictated by the desired relationship between axial clamping force and disc compression, as well as the allowable stress distribution across the disc, to suit the torque requirements of a particular vehicle.

The foregoing description represents merely exemplary embodiments of the present invention. Various changes may be made in the arrangements and details of production of the embodiments shown without departing from the spirit and scope of the present invention.

I claim:

1. In apparatus for securing a wheel to a support: an antifriction bearing having inner and outer races and with the outer race being carried by said support; a spindle extending through said inner race and with a shoulder bearing against the axially inner side edge of said inner race; a hub having a tubular portion extending from the axially outer side edge of said bearing and stopping short of said shoulder of said spindle, said hub having a shoulder positioned against the axially outer side edge of said inner race and a flange positioned axially outwardly of said bearing and support; a rotor having a mounting flange bearing against the axially outer side of said hub flange; a wheel mounting flange bearing against the axially outer side surface of said rotor mounting flange; an annular conically shaped hold down disc a peripheral side edge of which bears against the wheel mounting flange to sandwich said wheel mounting flange and said rotor mounting flange against said hub flange; and a securing nut threadedly supported on said spindle so that rotation in one direction forces it against an axially outer surface of said conically shaped hold down disc; and whereby the axial force exerted by said securing nut against said wheel mounting flange also sandwiches said inner race of said bearing between said shoulders of said hub and spindle.

2. A wheel mounting means according to claim 1, wherein the disc is uniform in thickness.

3. A wheel mounting means according to claim 1, wherein the disc radially varies in thickness such that it is symmetrical about its aperture.

4. A wheel mounting means according to claims 2 or 3, wherein said axially resilient disc has a spring characteristic whereby said disc exhibits a relationship between axial disc compression and axial clamping force having a first zone wherein the axial clamping force increases as the disc is compressed, a second zone wherein the variation in axial clamping force with increased disc compression is relatively small, and a third zone wherein the axial clamping force decreases with further disc compression, and whereby said second zone is utilized to prevent overloading of said antifriction bearing.

5. A wheel mounting means according to claim 1, further comprising locking means for preventing the securing nut from working loose.

6. In apparatus for securing a wheel to a support; a hub mounted on said support, said hub having a flange positioned axially outwardly of said support; a rotor having a mounting flange overlying and flatly abutting the axially outer side of said hub flange; a wheel mounting flange overlying and flatly abutting the axially outer side of said rotor flange; a threaded nut which when rotated moves axially toward or away from the axially outer face of said wheel mounting flange; means constructed and arranged to be restrained against axial movement by said support and on which said nut is threaded; and a conical spring with its radially inner end abutting said nut and its radially outer end overlying and abutting said wheel mounting flange, said spring being of a type having a force versus deflection characteristic wherein the force transmitted increases with deflection initially but is generally constant at a higher level of transmitted force, said mounting flanges being in superimposed metal to metal contact at least when said nut deflects said conical spring to said generally constant level of transmitted force; and abutment means for said nut limiting its deflection of said spring to a predetermined amount while said wheel disc and spring are unstopped against further spring compressing movement; and whereby work absorbed by movement of the wheel disc through a distance at the generally constant spring opposing force absorbs shock loads on the apparatus without overloading its parts.

7. In apparatus for securing a wheel to a support: a hub mounted on said support, said hub having a flange axially outwardly of said support; a rotor having a mounting flange overlying and flatly abutting the axially outer side of said hub flange; a wheel mounting flange overlying and flatly abutting the axially outer side of said rotor flange; a threaded nut which when rotated moves axially toward or away from the axially outer face of said wheel mounting flange; means constructed and arranged to be restrained against axial movement by said support and on which said nut is threaded; and a conical spring with its radially inner end abutted by said nut and its radially outer end overlying and abutting said wheel mounting flange, said spring being of a type having a force versus deflection characteristic wherein the force transmitted increases with deflection initially but is generally constant at a higher level of transmitted force; stop means against which said nut abuts to load said spring to a predetermined level of force while said wheel mounting flange is free to move away from said hub flange and compress said spring into said generally constant higher level of transmitted force; and whereby said movement at said generally constant higher level of transmitted force reduces shock loads on said apparatus.

8. In apparatus for securing a rotating mechanism to a support: a hub mounted on said support, said hub having a flange positioned axially outwardly of said support; said mechanism having a mounting flange in flat abuttment with the axially outer side of said hub flange; a threaded nut which when rotated moves axially toward or away from the axially outer face of said mounting flange; means constructed and arranged to be restrained against axial movement by said support and on which said nut is threaded: a conical spring with its radially inner end being abutted by said nut and its radially outer end overlying and abutting said mounting flange, said spring having a force versus deflection characteristic wherein the force transmitted increases with deflection during an initial zone of deflection and wherein the force transmitted is generally constant during a subsequent zone of deflection, said mounting flange for said mechanism being in generally uniform flat abuttment around said hub flange; stop means against which said nut abuts to limit initial spring hold down force to an initial value and said mechanism being unrestrained against movement against said spring to deflect said spring into said subsequent zone of generally constant transmitted force to absorb axial overloads on said mechanism.

9. In a vehicle wheel assembly having a spindle disposed in an axial direction, a wheel mounting flange mounted for rotation with said spindle, and wheel bearings for rotationally carrying said wheel and wheel mounting flange, a method of axially pre-loading said wheel bearings, comprising the steps of:
(a) providing an axially resilient disc, said disc being conically-shaped and diverging in an inward axial direction, said disc having a spring characteristic whereby when axially compressed into a preselected compressed state, the disc exerts a predetermined axial force,
(b) providing a threaded fastener affixed to said disc for threadably engaging an axially-extending portion of the spindle,
(c) threading said fastener upon said threaded portion of the spindle such that the disc is axially compressed against the wheel to a preselected compressed state, whereby said fastener imparts an outwardly-directed tensile force on said spindle and said disc resiliently imparts an inwardly-directed compression force on said wheel mounting flange, thereby loading said wheel bearings to a desired degree of axial compression.

* * * * *